US006623553B2

(12) United States Patent
Russell et al.

(10) Patent No.: US 6,623,553 B2
(45) Date of Patent: Sep. 23, 2003

(54) PRINTING PROCESS WITH EDIBLE INKS

(76) Inventors: John Russell, 11 Westlea, Bedlington, Northumberland NE22 6DX (GB); Andrew Candler, 47 The Avenue, Morpeth, Northumberland NE61 2DF (GB); Angela Wright, 176 Newbiggin Rd., Ashington, Northumberland NE63 0TL (GB)

(*) Notice: Subject to any disclaimer, the term of this patent is extended or adjusted under 35 U.S.C. 154(b) by 63 days.

(21) Appl. No.: 09/839,582

(22) Filed: Apr. 20, 2001

(65) Prior Publication Data

US 2002/0152927 A1 Oct. 24, 2002

(51) Int. Cl.$^7$ .......................... C09D 11/00; C09D 11/14
(52) U.S. Cl. ................ 106/31.13; 106/31.6; 106/31.68; 106/31.75; 106/31.86; 106/31.74; 106/31.69
(58) Field of Search .......................... 106/31.13, 31.6, 106/31.68, 31.75, 31.86, 31.74, 31.69

(56) References Cited

U.S. PATENT DOCUMENTS

| | | | |
|---|---|---|---|
| 161,740 A | 4/1875 | Dawkings | 137/286 |
| 196,885 A | 9/1877 | Baumann | 362/180 |
| 422,430 A | 1/1890 | Krier | 72/328 |
| 543,427 A | 2/1895 | Culpitt et al. | 178/18.05 |
| 628,886 A | 9/1899 | Jamin | 402/2 |
| 786,428 A | 11/1905 | White | 379/180 |
| 919,736 A | 4/1909 | Loesch | 426/87 |
| 1,605,903 A | 11/1926 | Schuler | 426/515 |
| 2,123,215 A | 7/1938 | Thomas | 426/279 |
| 2,347,022 A | 4/1944 | Austin | 101/129 |
| 2,353,594 A | 7/1944 | Seagren | 426/104 |
| 2,394,322 A | 2/1946 | McKee | 426/87 |
| 2,526,811 A | 10/1950 | Dawson | 83/109 |
| 2,578,150 A | 12/1951 | Rathke | 426/132 |
| 2,610,588 A | 9/1952 | Seagren et al. | 426/104 |
| 2,895,832 A | 7/1959 | Bersey | 426/87 |
| 3,052,552 A | 9/1962 | Koerner et al. | |
| 3,057,730 A | 10/1962 | Morck | 426/291 |
| 3,192,086 A | 6/1965 | Gyurk | 156/89.14 |
| 3,649,347 A | 3/1972 | Battista | 428/323 |
| 3,658,977 A | 4/1972 | Baker | 264/130 |
| 3,776,185 A | 12/1973 | Kawasaki | 118/406 |
| 3,852,494 A | 12/1974 | Williamson | 426/383 |
| 4,024,287 A | 5/1977 | Golchert | 426/383 |
| 4,061,783 A | 12/1977 | Hoffman et al. | 426/87 |
| 4,285,978 A | 8/1981 | Quinlivan | 426/87 |
| 4,388,862 A | 6/1983 | Thomas, Jr. | 101/126 |
| 4,409,893 A | 10/1983 | Newman et al. | 101/129 |
| 4,466,994 A | 8/1984 | Hubbard et al. | 427/542 |
| 4,531,292 A | 7/1985 | Pasternak | 33/18.1 |
| 4,537,647 A | 8/1985 | Foster | 156/245 |
| 4,548,825 A | 10/1985 | Voss et al. | 426/383 |
| 4,578,273 A | 3/1986 | Krubert | 426/87 |
| 4,592,916 A | 6/1986 | Akesson | 426/517 |
| 4,668,521 A | 5/1987 | Newsteder | 426/87 |
| 4,785,313 A | 11/1988 | Higuma et al. | 347/105 |
| 5,006,362 A * | 4/1991 | Hilborn | 101/37 |
| 5,017,394 A | 5/1991 | Macpherson et al. | 426/302 |
| 5,435,840 A | 7/1995 | Hilborn | |
| 5,485,189 A | 1/1996 | Ebata | 347/102 |
| 5,505,775 A | 4/1996 | Kitos | 118/14 |
| 5,711,791 A * | 1/1998 | Croker et al. | 106/31.35 |
| 5,795,395 A | 8/1998 | Ben-Matitayhu et al. | 118/712 |
| 5,834,047 A | 11/1998 | Ahn | 426/383 |
| 6,045,220 A | 4/2000 | Kiyohara et al. | 347/104 |
| 6,058,843 A | 5/2000 | Young | 101/483 |
| 6,251,452 B1 * | 6/2001 | Weinstein et al. | 426/249 |

FOREIGN PATENT DOCUMENTS

| | | |
|---|---|---|
| GB | 1 441 446 | 6/1976 |
| JP | 57-179263 | 11/1982 |
| JP | 58-052375 | 3/1983 |
| JP | 59-118049 | 7/1984 |
| JP | 60-126057 | 7/1985 |

* cited by examiner

*Primary Examiner*—Mark L. Bell
*Assistant Examiner*—Veronica F. Faison
(74) *Attorney, Agent, or Firm*—Fish & Richardson P.C.

(57) ABSTRACT

An edible ink with a viscosity of about 2000 to about 16000 cp at 25° C.

37 Claims, No Drawings

PRINTING PROCESS WITH EDIBLE INKS

TECHNICAL FIELD

The present invention relates to decorated food articles and methods for making them. More particularly, the invention relates to an edible ink composition, as well as a printing process for making a decorated food article with the ink composition.

BACKGROUND

The mass-market appeal of movie, television, and sports has created a demand for confections and other food articles with multi-colored decorations bearing the likenesses of media figures. Bakeries, supermarkets and other food retailers have used increasingly sophisticated printing techniques to create these images on food articles.

For example, in a screen printing process, positive images are created from an artwork design. Using this positive image, printing screens are exposed and developed to include a negative image of the artwork design. A first color of an edible ink is then sprayed through the screen and onto a surface of a substrate, typically an icing layer or a sugar sheet, to form an image layer on the surface of the substrate. This step is repeated, one color at a time, until the multi-colored image is formed on the surface of the substrate. In another well known process, a first color of an edible ink may be applied to a pad of an automatic pad transfer printer. The pad is then contacted with a hard, non-porous surface of an icing layer on a confection to form an image layer thereon. This step is repeated, one color at a time, until a multi-colored image layer is formed. In the alternative, the artwork may be electronically scanned and the image file downloaded to an ink jet printer having a cartridge filled with at least one edible ink. The ink jet printed then applies the ink to a surface of a substrate to form an image layer thereon.

These techniques are much more efficient than a hand decorating process, and have made possible the creation of larger numbers of high-quality decorated food articles for purchase by a consumer. However, these techniques are relatively slow and unsuited for high volume production of food articles.

In the commercial printing industry, lithographic printing processes are routinely used for high volume production of highly precise single or multi-colored images on paper articles. In the lithographic process, also referred to as offset, litho-offset, web and offset lithography, an ink receptive image is typed or drawn on a master or produced photographically on a sensitized photopolymer plate. An ink is applied to the imaged master or plate to form an ink layer thereon, and the master is then placed on the master cylinder of an offset printing press. The ink layer built up on the master is then transferred to a surface of a rubber blanket cylinder, and the ink layer is subsequently transferred to a paper substrate as the paper passes between the blanket cylinder and an impression cylinder.

Compared to screen printing or inkjet printing processes, lithographic printing makes possible increased production speeds, improved quality in the reproduction of fine tones, and a substantial reduction in the number of impressions required to reproduce full color images.

SUMMARY

In view of the cost and image quality advantages that lithographic printing provides compared to conventional screen printing and inkjet printing processes, it would be desirable to print food articles lithographically with edible inks. However, conventional edible inks used in screen and inkjet printing have too low a viscosity to be useful in high speed lithographic printing processes such as dry offset printing.

In one aspect, the invention is an edible ink that is capable of being used in a lithographic or other high speed printing process. This edible ink has a viscosity of about 2000 to about 16000 cp at 25° C., and may optionally include at least one soluble or insoluble pigment to provide a preferred pigment density of about 0.1 grams/liter to about 0.25 g/l and a preferred ink density of about 1.1 g/l to about 2.0 g/l.

In a second aspect, the invention is a printing process in which the edible ink is applied to an edible or inedible substrate. Preferably, the printing process is a lithographic printing process for forming an image layer on a substrate. In this process a layer of the edible ink is built up on a master, which is a photopolymer plate that includes an ink receptive image, to form an ink layer thereon. The ink layer is then transferred to a substrate in a lithographic printing press.

In a third aspect, the invention is a substrate having thereon an image layer of the edible ink.

In a fourth aspect, the invention is a decorating kit for use in printing on a surface of a substrate such as a lithographic printing master or an edible article such as a cake, candy and the like. The decorating kit includes a master or substrate and the edible ink.

The details of one or more embodiments of the invention are set forth in the description below. Other features, objects, and advantages of the invention will be apparent from the description, and from the claims.

DETAILED DESCRIPTION

The edible inks of the invention are capable of being used in a printing process to form an image layer on an edible or inedible substrate. The image layer on the substrate may include a single color or multiple colors, and should have acceptable definition, tonal value and registration to be useful as a decoration.

The edible ink preferably has a viscosity and a density sufficient to spread evenly over a master printing plate, adhere to the master printing plate, and subsequently transfer from the master to an edible article or a transfer sheet to form an image layer thereon. The viscosity of the edible ink may vary widely depending, for example, on the characteristics of the ink receptive layer on the master, the characteristics of the surface of the edible article or transfer sheet, the required drying time, and the like. Preferably, the edible ink has a viscosity of about 2000 to about 16000 cp, more preferably about 2400 to about 3100 cp, and most preferably about 2900 to about 3000 cp, as measured by a number 2 aperture Zahn cup at 25° C.

The term edible ink as used in this application refers to any composition that is suitable for human consumption and forms an image layer on an edible or inedible substrate in a commercially feasible time. Edible inks suitable for human consumption comply with applicable standards such as FD&C regulations in the United States and E.E.C. standards in the European Union.

If the edible article or transfer sheet is to be transported or stored without freezing, the edible ink may be formulated as an aqueous composition. The aqueous edible ink composition includes about 10% to about 20% by weight, preferably about 15% by weight, water, about 70% to about 80% by weight of at least one sweetener, about 5% to about 10% by weight of at least one emulsifier and/or hydrocolloid stabilizer, about 1% to about 5% by weight of a humectant, and at least one soluble or insoluble pigment. In this application, all percentages are by weight unless otherwise indicated.

The sweeteners provide flavor, enhance adherence to the printing plate (stickiness), act as pigment carriers, and function as a diluent in the ink composition. Suitable sweeteners may include, for example, glucose, sorbitol, sucrose, dextrose, and fructose, as well as artificial sweeteners such as aspartame and saccharin. A preferred ink formulation may include about 18% to about 28% by weight of glucose, about 18% to about 28% by weight sorbitol, about 18% to about 36% sucrose, and about 2% to about 6% by weight dextrose. A most preferred ink formulation may include about 23% by weight glucose, about 23% by weight sorbitol, about 27% by weight sucrose, and about 4% by weight dextrose.

The aqueous formulation of the edible ink also includes an emulsifier and/or a hydrocolloid stabilizer. These compounds act as a stabilizer and/or a thickening agent, and additionally enhance the release properties of the ink. Suitable emulsifiers include, for example, lecithin, crillet and polyoxyethylene sorbitan monostearate, which is available from many sources under the generic name TWEEN. Suitable hydrocolloid stabilizers include, for example, xanthan gum, sorbitol, and starches such as maize starch, corn starch and potato starch. Preferably, the aqueous formulation includes about 3% by weight of polyoxyethylene sorbitan monostearate and about 3% by weight of lecithin.

The aqueous formulation of the edible ink further includes about 2% of a humectant. Suitable humectants include, for example, glycerine, sorbitol and mannitol.

In the aqueous formulation of the edible ink, sorbitol may be used alone or in combination with other compounds as at least one of a sweetener, a hydrocolloid stabilizer or a humectant. However, the amount of sorbitol in the formulation should be controlled to maintain an acceptable level of adherence to the printing plate. Preferably, sorbitol is used in the edible ink composition to take advantage of its properties as a humectant.

To provide a properly colored image, the edible ink optionally includes one or more soluble or insoluble pigments. The pigments should be present in a sufficient concentration to provide a pigment density of about 0.1 g/l to about 0.25 g/l. The edible ink preferably has a density, referred to herein as the ink density, of about 1.1 g/l to about 1.4 g/l, most preferably about 1.15 g/l to about 1.40 g/l. The pigments used in the aqueous formulation of the edible ink may vary widely, and any known pigment approved for human consumption in a particular country may be used. Suitable pigments include, for example, carmoisine, quinoline, ponceau 4R, cochineal, curcumin, copper chlorophyllin, anthocyanin, vegetable carbon, patent blue V, tartrazine titanium dioxide, and FD&C pigments such as yellow 5, yellow 6, red 3, red 40, blue 1, blue 2 and mixtures thereof.

If the edible article is to be frozen prior to consumption, an organic formulation of the edible ink may be used to provide an image layer on the edible article that is freeze/store stable. The organic formulation of the edible ink includes about 70% to about 80% by weight of a barrier forming compound to seal the image layer and protect it from water produced in the thawing process. The organic formulation of the edible ink also preferably includes about 1% to about 10% by weight of a drying agent, about 10% to about 20% by weight of a film former, about 1% to about 3% by weight of an emulsifier, about 1% to about 5% by weight water, and about 1% by weight of a water repellant.

The barrier forming compound acts as a pigment carrier, enhances adhesion to the printing plate (stickiness), and forms a skin layer to protect the image layer from water produced during thaw. Preferred barrier forming compounds include shellac/glaze solutions, as well as waxes such as beeswax and carnauba wax. Typical shellac formulations include about 40% by weight of a shellac and about 60% by weight of an alcohol. The barrier forming compound is preferably present in the organic edible ink formulation at a concentration of about 75% by weight.

The drying agent may vary widely depending on the desired evaporation rate of the edible ink formulation, as well as on the characteristics of the substrate to which the edible ink is to be applied. Preferred drying agents include alcohols such as methyl alcohol, ethyl alcohol, isopropyl alcohol and butyl alcohol, as well as mixtures thereof. A preferred mixture of alcohols includes about 1.5% by weight of each of isopropyl, ethyl and butyl alcohols.

At least one film former should be included in the organic formulation of the edible ink of the invention at a concentration sufficient to allow the image layer adhere to the printing plate and then "skin" rapidly after it is applied to a particular substrate. These compounds provide the edible ink composition with sufficient intrinsic strength to release from a printing plate or a roller in a printing apparatus. A preferred organic formulation includes about 15% by weight of the film former. Suitable film formers include gums such as gum acacia, locust bean gum, guar gum, methylcellulose, polyvinylpyrrolidone, gelatins, carrageenan, pectin, purified shellacs, methocel and hydroxypropylmethylcellulose. Polyvinylpyrrolidone (PVP) and hydroxypropylmethylcellulose are particularly preferred, and preferred formulation includes about 5% by weight polyvinylpyrrolidone and about 10% by weight hydroxypropylmethylcellulose.

The organic formulation of the edible ink should include about 1% to about 3% by weight, preferably about 2% by weight, of an emulsifier and/or a hydrocolloid stabilizer. Suitable emulsifiers include, for example, lecithin, crillet and polyoxyethylene sorbitan monostearate (TWEEN). Suitable hydrocolloid stabilizers include, for example, xanthan gum, sodium alginate, sorbitol, and starches such as maize starch, corn starch and potato starch. Lecithin and sodium alginate are particularly preferred.

The organic formulation of the edible ink further includes about 1% by weight of a water repellant. Suitable water repellants include dimethylpolysiloxane.

To provide a properly colored image, the edible ink optionally includes one or more soluble or insoluble pigments. The pigments should be present in a sufficient concentration to provide a pigment density of about 0.1 g/l to about 0.25 g/l. The pigments used in the organic formulation of the edible ink may vary widely, and any known pigment approved for human consumption may be used. Suitable pigments include, for example, carmoisine, quinoline, ponceau 4R, cochineal, curcumin, copper chlorophyllin, anthocyanin, patent blue V, tartrazine, vegetable carbon, titanium dioxide, and FD&C pigments such as yellow 5, yellow 6, red 3, red 40, blue 1, blue 2 and mixtures thereof.

The edible ink formulation may be applied to an ink receptive image on a master in any suitable lithographic printing apparatus or process. The edible ink formulation adheres to the receptive image and forms an ink layer thereon. For example, printing processes that may be used include, wet offset, lithographic blanket transfer, flexographic Anolux roller transfer, letter press rotary relief plate, web print, reel to reel and gravure.

Preferred printing apparatus include dry offset printers available from Heidelberg Druckmaschinen AG, Heidelberg, Germany, A.B. Dick-Itek Limited, Middlesex, England and Sakurai Machinery, Koto-ku, Tokyo, Japan. In a dry offset process, the master is typically a photopolymer plate to which an ink receptive image is applied. The ink receptive image may be created on the master by, for example, typing or a photographic process. The edible ink is then applied to the ink receptive image on the master to form an ink layer thereon. The ink may be applied to the master by any suitable technique, and is typically applied using via a series of rubber blanket rollers, at an ink bed thickness of about 10 to about 20 microns.

The ink layer then releases cleanly from the printing plate and is subsequently transferred to a surface of a food article or a transfer sheet to produce an image layer thereon. For example, in the typical lithographic printing press, the transfer of the built up ink layer on the master to the edible article or transfer sheet is made via an intermediary blanket cylinder. The edible article or transfer sheet picks up the ink layer from the blanket cylinder, typically a rubber roller, as the article/sheet passes between the blanket cylinder and an impression cylinder. The transfer of the ink layer from the blanket cylinder to form the image layer on the edible article/transfer sheet should be conducted at a suitable temperature and relative humidity to achieve a clean and total transfer of the ink layer. The resultant image layer should be clearly defined, with sharp edges, a correct tonal value, and accurate color registration.

The image layer, which typically is applied on the edible article or transfer sheet at a thickness of about 4 microns to about 6 microns, should preferably become substantially nontacky to the touch in about 1 minute in air under suitable transfer and drying conditions. Suitable transfer and drying conditions for the image layer are a temperature of about 18–20° C. at about 63–70% relative humidity. The image layer should also preferably become dry to the touch in about 5 minutes under these transfer and drying conditions. This prevents inadvertent running and/or smearing and facilitates the use of the ink composition in a high volume production process. If necessary in a high volume application, heat may optionally be used to reduce drying time.

The surfaces on which the edible (printed) image layer may be applied may vary widely, and may include any surface with sufficient strength and suitable surface characteristics to accept the transfer. Examples include relatively thin edible materials such as wafers, rice paper, sugar fondant paste, sugar sheets, starch sheets, icings on confections such as cakes, cupcakes, muffins, doughnuts, cookies and the like, as well as chocolates, candy coatings and ice cream. The transfer sheets, which are typically non-edible materials, may be selected from any material suitable for contact with foods. The materials used for the transfer sheet should be substantially free of surface non-food grade chemicals that could potentially contaminate an edible article or the edible ink. Suitable materials for the transfer sheet include papers having thereon a coating of a plastic or a wax. Papers coated with polypropylene or acetates are preferred.

The edible ink formulations may be provided as part of a decorating kit for use in decorating an edible article. The kit may include a lithographic printer master and the edible ink for use in a lithographic printer. The kit may also include a transfer sheet having applied on at least one surface thereof an image layer of the edible ink.

If the edible ink is applied to a transfer sheet, and the resultant ink layer is contacted with the surface of an edible article, the ink layer softens and becomes flowable. Once the ink becomes flowable, the transfer sheet may be removed. As the transfer sheet is peeled away, the ink releases substantially completely from the transfer sheet and transfers to the surface of the edible article to form an image layer thereon. Preferably, transfer of a full and complete image takes about 20 seconds at room temperature. To enhance transfer speed and efficiency, the surface of the edible article may optionally be moistened with any suitable wetting agent. Water is particularly preferred for this purpose.

If the surface of the edible article is non-porous, once the transfer sheet is removed the ink layer dries to form a colorfast and brilliantly colored image layer on the surface. However, if the surface is porous, such as, for example, a cake icing, the flowable ink penetrates and is absorbed into the porous surface. Following this penetration step, at least a portion of the image layer lies beneath the surface. This provides an image layer that is particularly resistant to smearing and bleeding. Heat may be used to reduce the drying time of the image layer.

The printing process of the invention may be a part of any known process for making an edible article. Once an edible article is formed and baked or otherwise processed, a coating is applied to the article, such as an icing, chocolate, a hard coating or the like. An image layer may then be formed on a portion of an exposed surface of the coating using the process described above.

The invention will now be described with reference to the following non-limiting examples.

EXAMPLES

Example 1

Aqueous Ink Formulation

At room temperature, 23 g glucose, 23 g sorbitol and 15 g water were placed in a stainless steel vessel and mixed for one minute with a hand held electric blender. Soluble pigments were then added and blended until dissolved. Insoluble pigments were then added and blended until dispersed.

3 g of lecithin and 3 g of polyoxyethylene sorbitan monostearate were added and blended for 5 minutes, then 27 g sucrose and 4 g dextrose were added and blended until dissolved. Next, 2 g glycerine were added and blended until dissolved.

The resulting mixture was then passed two times through a two tier jar mill at 25 rpm.

The aqueous edible ink formulation, which had a viscosity of about 2485 cp at 25° C. a pigment density of about 0.16 g/l, and an ink density of about 1.3 g/l was applied to a photopolymer plate master to form an ink layer thereon, and the master was inserted into an offset printer model GTO-52, available from Heidelberg. The ink was transferred to a wafer to form an image layer thereon. The image layer dried in about 1 to about 5 minutes, and was clearly defined with sharp edges. Examination indicated that the image had the desired tonal value and accurate color registration.

Example 2

Organic Ink Formulation

At room temperature, soluble pigments were dissolved in 2.50 g of water using a hand held blender. The resulting solution was added to and blended gently with 75 g of a shellac solution containing 35% solids in an alcohol base. Next, insoluble pigments were added and blended until dispersed. 5 g of polyvinylpyrrolidone and 10 g hydroxypropylmethyl cellulose were added and allowed to hydrate for one hour. The resulting solution, referred to hereafter as Solution 1, was blended gently until all residual solids were dissolved.

In a separate vessel, 1 g of dimethylpolysiloxane and 1 g of sodium alginate were blended with 1.50 g of isopropyl alcohol, 1.50 g of ethyl alcohol, and 1.50 g of butyl alcohol. The resulting solution, referred to herein as Solution 2, was passed two times through a two tier jar mill at 25 rpm.

The milled Solution 2 was then added to Solution 1 and blended until homogenous, and the homogenous mixture was passed through the two tier jar mill at 25 rpm.

The resulting organic edible ink formulation, which had a viscosity of about 2482 cp at 25° C., a pigment density of 0.16 g/l, and an ink density of 1.3 g/l was applied to a photopolymer plate master to form an ink layer thereon. The master was inserted into an offset printer model GTO 52, available from Heidelberg. The ink was transferred to a wafer to form an image layer thereon. The image layer dried in about 15 seconds, and was clearly defined with sharp edges. Examination indicated that the image had the desired tonal value and accurate color registration.

A number of embodiments of the invention have been described. Nevertheless, it will be understood that various modifications may be made without departing from the spirit and scope of the invention. Accordingly, other embodiments are within the scope of the following claims.

What is claimed is:

1. An edible ink comprising about 10% to about 20% by weight water, about 70% to about 80% by weight of at least one sweetener, about 5% to about 10% by weight of at least one emulsifier, about 1% to about 5% of a humectant, wherein the ink has a viscosity of about 2000 to about 3100 cp at 25° C.

2. The edible ink of claim 1, further comprising at least one soluble or insoluble pigment, wherein the ink has a pigment density of about 0.1 g/l to about 0.25 g/l and an ink density of about 1.1 g/l to about 2.0 g/l.

3. The edible ink of claim 1, wherein the sweetener is selected from the group consisting of glucose, sorbitol, sucrose, and dextrose.

4. The edible ink of claim 1, wherein the sweetener comprises about 18% to about 28% by weight glucose, about 18% to about 28% by weight sorbitol, about 18% to about 36% sucrose, and about 2% to about 6% by weight dextrose.

5. The edible ink of claim 1, wherein the sweetener comprises about 23% by weight glucose, about 23% by weight sorbitol, about 27% by weight sucrose, and about 4% by weight dextrose.

6. The edible ink of claim 1, wherein the emulsifier is selected from the group consisting of lecithin and polyoxyethylene sorbitan monostearate.

7. The edible ink of claim 1, wherein the emulsifier comprises about 3% by weight of polyoxyethylene sorbitan monostearate and about 3% by weight of lecithin.

8. The edible ink of claim 1, wherein the ink comprises about 2% by weight of the humectant.

9. The edible ink of claim 8, wherein the humectant is glycerine.

10. A printing process comprising applying the ink of claim 1 to a substrate.

11. An edible ink comprising about 70% to about 80% by weight of a barrier forming compound, about 1% to about 10% by weight of a drying agent, about 10% to about 20% by weight of a film former, about 1% to about 3% by weight of an emulsifier, about 1% to about 5% by weight water, about 1% by weight of a water repellant, wherein the ink has a viscosity of about 2000 to about 3100 cp at 25° C.

12. The edible ink of claim 11, further comprising at least one soluble or insoluble pigment, wherein the ink has a pigment density of about 0.1 g/l to about 0.25 g/l and an ink density of about 1.1 g/l to about 2.0 g/l.

13. The edible ink of claim 11, wherein the barrier forming compound comprises a shellac/glaze solution.

14. The edible ink of claim 11, wherein the ink comprises about 75% by weight of the barrier forming compound.

15. The edible ink of claim 11, wherein the drying agent comprises an alcohol selected from the group consisting of methyl alcohol, ethyl alcohol, isopropyl alcohol and butyl alcohol, and mixtures thereof.

16. The edible ink of claim 11, wherein the drying agent comprises about 1.5% by weight of each of isopropyl, ethyl and butyl alcohols.

17. The edible ink of claim 11, wherein the ink comprises about 15% by weight of the film former.

18. The edible ink of claim 11, wherein the film former comprises about 5% by weight polyvinylpyrollidone and about 10% by weight hydroxypropylmethylcellulose.

19. The edible ink of claim 11, wherein the ink comprises about 1% to about 3% by weight of an emulsifier.

20. The edible ink of claim 11, wherein the emulsifier is lecithin.

21. The edible ink of claim 11, wherein the ink comprises about 1% by weight of the water repellant.

22. The edible ink of claim 11, wherein the water repellant is dimethylpolysiloxane.

23. A printing process comprising applying the ink of claim 11 to a substrate.

24. A lithographic printing process for forming an image layer on a surface of an edible article, comprising:
   (a) providing a master with an ink receptive layer thereon;
   (b) contacting the ink receptive layer with an edible ink to form an ink layer thereon, wherein the edible ink has a viscosity of about 2000 to about 3100 cp at 25° C.;
   (c) transferring the ink layer to a substrate to form an image layer thereon.

25. The process of claim 24, wherein the edible ink comprises about 10% to about 20% by weight water, about 70% to about 80% by weight of at least one sweetener, about 5% to about 10% by weight of at least one emulsifier, and about 1% to about 5% of a humectant.

26. The process of claim 24, wherein the edible ink further comprises at least one soluble or insoluble pigment, and wherein the ink has a pigment density of about 0.1 g/l to about 0.25 g/l and an ink density of about 1.1 g/l to about 2.0 g/l.

27. The process of claim 24, wherein the edible ink comprises about 70% to about 80% by weight of a barrier forming compound, about 1% to about 10% by weight of a drying agent, about 10% to about 20% by weight of a film former, about 1% to about 3% by weight of an emulsifier, about 1% to about 5% by weight water, and about 1% by weight of a water repellant.

28. The process of claim 27, wherein the edible ink further comprises at least one soluble or insoluble pigment, and wherein the ink has a pigment density of about 0.1 g/l to about 0.25 g/l and an ink density of about 1.1 g/l to about 2.0 g/l.

29. The process of claim 24, wherein the substrate is selected from the group consisting of wax coated paper, plastic coated paper and acetate paper.

30. The process of claim 24, wherein the plastic coated paper is a polypropylene coated paper.

31. The edible ink of claim 24, wherein the hydrocolloid stabilizer is sodium alginate.

32. The process of claim 24, wherein step (c) comprises transferring the ink layer to a surface of a blanket cylinder, and transferring the ink layer from the blanket cylinder to the substrate to form an image layer thereon.

33. The process of claim 32, wherein the blanket cylinder is a rubber roller.

34. A decorating kit comprising a substrate having printed thereon a substantially non-tacky layer of an edible ink comprising about 10% to about 20% by weight water, about 70% to about 80% by weight of at least one sweetener, about 5% to about 10% by weight of at least one emulsifier, about 1% to about 5% of a humectant, wherein the ink has a viscosity of about 2000 to about 3100 cp at 25° C., wherein the edible ink is applied to the substrate using a lithographic printing process.

35. A lithographic printer comprising a master having an edible ink thereon, wherein the edible ink comprises about 10% to about 20% by weight water, about 70% to about 80% by weight of at least one sweetener, about 5% to about 10% by weight of at least one emulsifier, about 1% to about 5% of a humectant, and has a viscosity of about 2000 to about 3100 cp at 25° C. and a pigment density of about 0.1 g/l to about 0.25 g/l and an ink density of about 1.1 g/l to about 2.0 g/l.

36. The edible ink of claim 11, wherein the ink further comprises about 1% to about 3% by weight of a hydrocolloid stabilizer.

37. The process of claim 36, wherein the substrate is selected from the group consisting of sugar fondant, wafer, rice paper, starch sheets, sugar sheets and icings.

* * * * *